P. BOSSU.
GEAR COUPLING.
APPLICATION FILED APR. 19, 1919.
1,343,031.
Patented June 8, 1920.
2 SHEETS—SHEET 1.
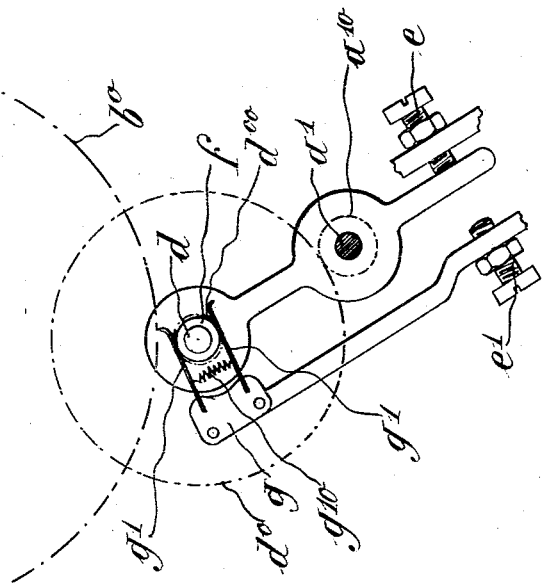
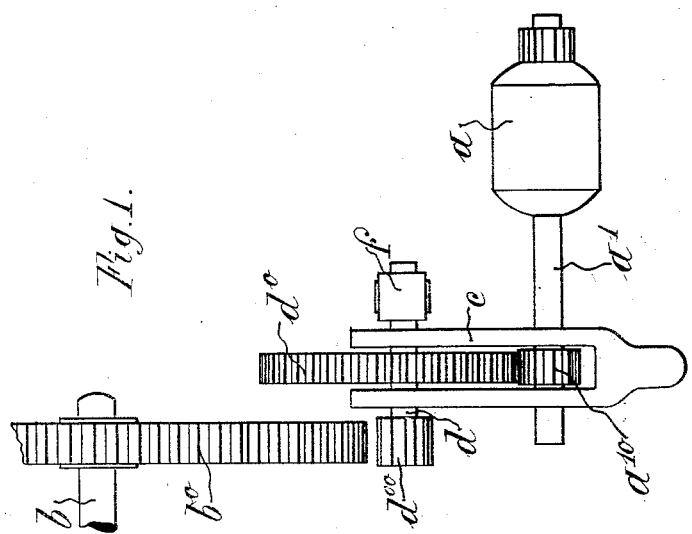

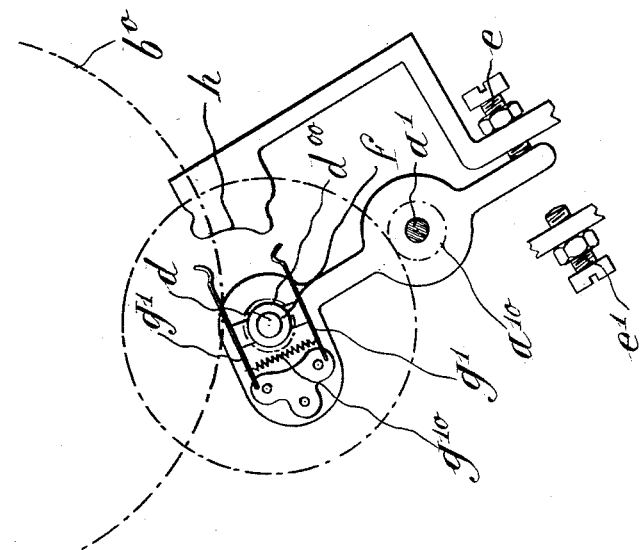
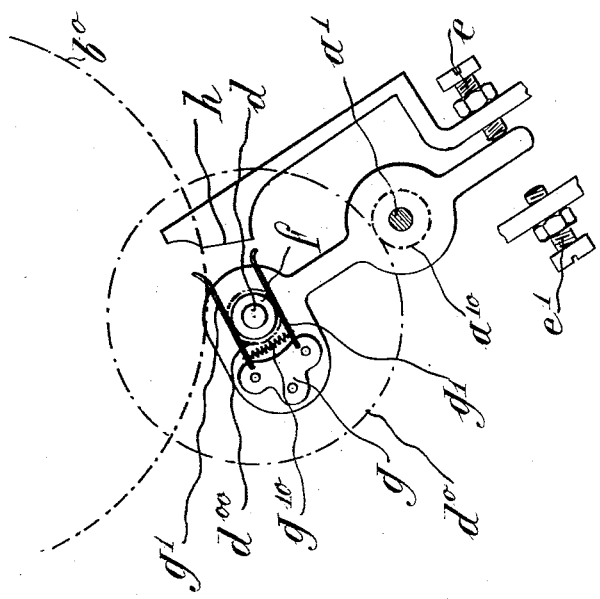

UNITED STATES PATENT OFFICE.

PIERRE BOSSU, OF NEUILLY-SUR-SEINE, FRANCE.

GEAR-COUPLING.

1,343,031.      Specification of Letters Patent.      Patented June 8, 1920.

Application filed April 19, 1919. Serial No. 291,353.

*To all whom it may concern:*

Be it known that I, PIERRE BOSSU, citizen of the French Republic, residing at Neuilly-sur-Seine, Department of Seine, France, have invented certain new and useful Improvements in Gear-Couplings; and I do hereby declare the following to be a full, clear, and exact description of the invention, such as will enable others skilled in the art to which it appertains to make and use the same.

The invention relates to gear couplings and particularly those interposed between a driving shaft and the apparatus which is driven by the shaft, and is based on the well known action of the inertia of a movable body on starting, the vis inertiæ being utilized to produce an action sufficient to bring the gears into engagement, the reaction of the starting apparatus keeping the gears in engagement.

In such arrangement what may be termed a floating wheel is employed intermediate the driving and driven wheels or pinions, the intermediate pinion being mounted on a shaft carried by a rocking frame or arm, which shaft also carries a gear wheel which is always in gear with the driving shaft. This frame is so pivoted about the latter shaft that the intermediate pinion is normally out of engagement with the corresponding pinion on the driven shaft, but on the starting of the driving shaft, the vis inertiæ of the gear wheel driven by it will cause the frame to rock and to bring the intermediate pinion into gear with the pinion on the driven shaft.

For the purpose of insuring a reliable action I provide a brake device, which will increase or supplement the vis inertiæ but will be released immediately the two gears interengage.

The invention will be described in connection with the starting gear for an internal combustion engine in which an electric motor is employed as the starting means.

Figure 1 represents an end view, and

Fig. 2 a side view of the rocking frame and brake device here shown as applied to toothed gearing, although the invention is not limited to the particular kind of transmission gear employed.

Figs. 3 and 4 illustrate two modified forms of brake mechanism.

The electric motor $a$ is so arranged that its shaft $a'$ is parallel with the shaft $b$ of the motor on which the starting action is to be effected. A toothed wheel $a^{10}$ is keyed on the shaft $a'$, and a toothed wheel $b^{\circ}$ on the shaft $b$.

An arm or frame $c$ is freely pivoted on the shaft $a'$, this frame being preferably constituted by a fork between the arms of which the pinion $a^{10}$ lies. An intermediate shaft $d$ is mounted in the free or outer ends of these arms, this shaft carrying, on the one hand, a toothed wheel $d^{\circ}$ which is always in gear with the wheel $a^{10}$, and, on the other hand, a toothed wheel $d^{\circ\circ}$, which could be merged into the wheel $d^{\circ}$, adapted to engage with the wheel $b^{\circ}$. Further, stops $e$, $e'$ are arranged on both sides of the other end of the frame $c$, these stops being preferably adjustable, in order to limit the rocking motion of the frame, the whole being so arranged that when the electric motor $a$ is stopped, the lower end of the arm $c$, owing to the pivotal arrangement of the arm, makes contact with the stop $e$ so that the toothed wheel $d^{\circ\circ}$ is out of engagement with the wheel $b^{\circ}$, while when the motor $a$ is started, owing to the initial resistance, due to inertia, of the wheels $d^{\circ}$ and $d^{\circ\circ}$ to being rotated by the wheel $a^{10}$, the arm $c$ will oscillate and move the wheel $d^{\circ\circ}$ into engagement with the wheel $b^{\circ}$.

In such systems the operations will be assured with greater certainty in accordance, as, on the one hand, the inertia opposed by the wheels $d^{\circ}$ and $d^{\circ\circ}$ to their being rotated is greater, and, on the other hand, the inertia opposed by the arm $c$ to its angular movement is less.

But it is impossible to reduce the inertia of the arm $c$ below a certain minimum since the arm must have the necessary resistance for its action, and further, the weight of the wheels $d^{\circ}$ and $d^{\circ\circ}$ must not be too great as it is added to the weight of the arm $c$.

The system may be so arranged without increasing the weight of the wheels $d^{\circ}$ and $d^{\circ\circ}$ as to increase these wheels' inertia resistance against rotation up to the moment when the wheel $d^{\circ\circ}$ engages with the wheel $b^{\circ}$, by the employment of suitable braking mechanism.

To this end a wheel or drum $f$ is mounted on the axle $d$ of the wheels $d^{\circ}$ and $d^{\circ\circ}$ and a brake is so arranged that it exercises a braking action on the drum $f$ in all positions taken up by the arm $c$, except that wherein the wheel $d°°$ is in engagement with the pinion $b°$.

As shown in Fig. 2, at a fixed point, here shown as on an arm to which the stop $e'$ is secured, a member $g$ is fixed having two arms $g'$ which may be elastic or hinged and which are drawn toward each other by a spring $g^{10}$ so that they may press against opposite sides of the drum $f$, thus exerting a braking action upon it, up to the moment when on the rocking of the arm $c$, the latter arrives in the position when the wheel $d°°$ engages the wheel $b°$, when the drum becomes disengaged from the arm $g'$.

Or, as shown in Figs. 3 and 4, the member $g$ may be mounted on or form part of the arm $c$ itself, the arms $g'$ being disengaged from the drum $f$, at the moment when the wheel $d°°$ engages the wheel $b°$, owing to an abutment $h$ engaging the ends of the arms $g'$ and separating them so as to disengage them from the drum $f$.

Preferably, in the latter case, the free ends of the arm and the abutment $h$ are so shaped that when the arms are opened by the abutment they grip the latter and remain in that position, while the wheel $d°°$ is in gear with the wheel $b°$. (See Fig. 4).

A starting system for explosion motors is thus obtained in which the inertia resistance to rotation of the wheels $d°$ and $d°°$ is sufficient to bring the gears into engagement, in which afterward the reaction of the starting motor retains the gears in engagement and in which, finally, directly the engine starts, the reaction becomes an action tending to produce the disengagement.

It is to be understood that the invention is not limited in any way to the constructions or arrangements described, but is capable of the numerous variations that may be included within the spirit and scope of the appended claims.

What I claim and desire to secure by Letters Patent is:—

1. A rocking coupling for gearing comprising a motor shaft, a rocking frame thereon, a gear on said shaft, a driven shaft having a gear mounted thereon, an axle rotatable in said frame, gearing thereon, driven by the gear on the driving shaft, said gearing being normally out of engagement with the gear on the shaft, and a brake device adapted to act on the axle in all positions of the frame except when said axle gearing is in engagement with the gear on the shaft.

2. A rocking coupling for gearing comprising a motor shaft, a rocking frame thereon, a gear on said shaft, a driven shaft having a gear mounted thereon, an axle rotatable in said frame, gearing thereon, driven by the gear on the motor shaft, said gearing being normally out of engagement with the gear on the shaft to be driven, a brake device adapted to act on the axle in all positions of the frame except when said axle gearing is in engagement with the gear on the shaft to be driven, and abutments for the frame to limit its rocking motion.

3. A rocking coupling for gearing comprising a motor shaft, a rocking frame thereon, a gear on said shaft, a driven shaft having a gear mounted thereon, an axle rotatable in said frame, gearing thereon driven by the gear on the motor shaft, said gearing being normally out of engagement with the gear on the shaft to be driven, a drum on the axle, and a spring brake device engaging said drum to exert a braking action thereon in all positions of the frame except when its gearing is in engagement with the gear on the shaft to be driven.

4. A rocking coupling for gearing comprising a motor shaft, a rocking frame thereon, a gear on said shaft, a driven shaft having a gear mounted thereon, an axle rotatable in said frame, gearing thereon driven by the gear on the motor shaft, said gearing being normally out of engagement with the gear on the shaft to be driven, a drum on the axle, a spring brake device engaging said drum to exert a braking action thereon in all positions of the frame except when its gearing is in engagement with the gearing on the shaft to be driven and abutments for the frame to limit its rocking motion.

5. A rocking coupling for gearing comprising a motor shaft, a rocking frame thereon, a gear on said shaft, a driven shaft having a gear mounted thereon, an axle rotatable in said frame, gearing thereon driven by the gear on the driving shaft, said gearing being normally out of engagement with the gear on the shaft to be driven, a drum on the axle, a spring brake mounted on the frame and engaging the drum, and means to disengage the spring brake from the drum when the frame is rocked in one direction.

6. A rocking coupling for gearing comprising a motor shaft, a rocking frame thereon, a gear on said shaft, a driven shaft having a gear mounted thereon, an axle rotatable in said frame, gearing thereon driven by the gear on the driving shaft, said gearing being normally out of engagement with the gear on the shaft to be driven, a drum on the axle, a spring brake device carried by the frame engaging said drum to exert a braking action thereon in all positions of the frame except when its gear is in engagement with the gear on the shaft to be driven, means for disengaging the spring brake device from the drum when the said gears are in engagement and abutments for the frame to limit its rocking motion.

7. A rocking coupling for the starting gear of internal combustion engines comprising a frame pivotally supported on the driving shaft of a starting motor, an axle mounted on the outer end of said frame, interengaging gear wheels on said shaft and axle, a spring brake acting on said axle, and means for disengaging the spring brake, when the frame is rocked in one direction.

8. A rocking coupling for the starting gear of internal combustion engines comprising a frame pivotally supported on the driving shaft of a starting motor, an axle mounted on the outer end of said frame, interengaging gear wheels on said shaft and axle, a spring brake acting on said axle, and an abutment adapted to disengage the spring brake when the frame is rocked in one direction and to hold it disengaged while in that position.

In testimony whereof I have hereunto set my hand in presence of two subscribing witnesses.

PIERRE BOSSU.

Witnesses:
 JOHN F. SIMONS,
 S. PELLIER.